US010445273B2

(12) United States Patent
Coglitore et al.

(10) Patent No.: US 10,445,273 B2
(45) Date of Patent: Oct. 15, 2019

(54) SYSTEMS, APPARATUS AND METHODS FOR MANAGING CONNECTIVITY OF NETWORKED DEVICES

(71) Applicant: R-Stor Inc., Saratoga, CA (US)

(72) Inventors: Giovanni Coglitore, Saratoga, CA (US); Roger Levinson, San Jose, CA (US)

(73) Assignee: R-Stor Inc., Saratoga, CA (US)

( * ) Notice: Subject to any disclaimer, the term of this patent is extended or adjusted under 35 U.S.C. 154(b) by 0 days.

(21) Appl. No.: 16/165,767

(22) Filed: Oct. 19, 2018

(65) Prior Publication Data

US 2019/0121768 A1 Apr. 25, 2019

Related U.S. Application Data

(60) Provisional application No. 62/574,396, filed on Oct. 19, 2017.

(51) Int. Cl.
| | |
|---|---|
| *G06F 13/38* | (2006.01) |
| *G06F 13/40* | (2006.01) |
| *G06F 13/42* | (2006.01) |
| *H04L 12/931* | (2013.01) |
| *H04L 29/08* | (2006.01) |
| *H04L 29/06* | (2006.01) |

(52) U.S. Cl.
CPC ........ *G06F 13/387* (2013.01); *G06F 13/4018* (2013.01); *G06F 13/4221* (2013.01); *H04L 49/357* (2013.01); *H04L 67/1097* (2013.01); *H04L 69/08* (2013.01); *H04L 69/18* (2013.01)

(58) Field of Classification Search
None
See application file for complete search history.

(56) References Cited

U.S. PATENT DOCUMENTS

| 8,149,862 B1 | 4/2012 | Forrest et al. | |
| 8,553,578 B2 * | 10/2013 | Alshinnawi ........... | G06F 13/387 370/252 |
| 2012/0233368 A1 | 9/2012 | Alshinnawi et al. | |

OTHER PUBLICATIONS

WO, International Search Report & Written Opinion, Application No. PCT/US2018/056584, dated Feb. 14, 2019.

* cited by examiner

*Primary Examiner* — Henry Tsai
*Assistant Examiner* — Aurangzeb Hassan
(74) *Attorney, Agent, or Firm* — Orrick, Herrington & Sutcliffe LLP

(57) ABSTRACT

Systems, methods and apparatus, including computer program products, are disclosed for management and transportation of data in a networked environment or solution. In various embodiment, these technologies are used to transport data across individual wires or connections using uniform connection technology but different protocols. Software-based control is also described, which provides additional flexibility in the selection and configuration of protocol usage.

42 Claims, 9 Drawing Sheets

SYSTEMS, APPARATUS AND METHODS FOR MANAGING CONNECTIVITY OF NETWORKED DEVICES

CROSS-REFERENCE TO RELATED APPLICATIONS

This application claims the benefit of, and priority to, U.S. Provisional Application Ser. No. 62/574,396, filed Oct. 19, 2017, the disclosure of which is hereby incorporated herein by reference in its entirety and for all purposes.

FIELD

This specification and the accompanying figures relate generally to connectivity of networked devices and the associated protocols, including systems, apparatus and methods for the same.

The systems, apparatus and methods disclosed herein and depicted in the accompanying figures describe particular embodiments and are not intended to be exhaustive of the contemplated configurations and processes.

BACKGROUND

In traditional computer system network architectures, devices such as computer servers and storage devices are interconnected through wires (e.g., copper or optical) which transport data between the devices. FIG. 1A shows an example of a wire 101 over which formatted data is transported, for example, using the Ethernet protocol. The data is typically in the form of "bits" which are represented as "1's" and "0's" and are physically formed by voltage, current and/or light. Devices can be connected, for example, locally on the same motherboard, or between different pieces of equipment through longer connectors such as copper wires or optical fiber using connectors such as Small Form-factor Pluggable (SFP), Quad Small Form-factor Pluggable (QSFP), or Gigabit Interface Converter (GBIC) modules. FIG. 1B shows an exemplary QSFP connected cable 111.

The data on an interconnect or wire is generally encoded into a standard protocol (such as, for example, Ethernet, Peripheral Component Interconnect (PCI), Peripheral Component Interconnect Express (PCIe or PCI-E), Serial Attached SCSI (SAS), Serial AT Attachment (Serial ATA or SATA), FiberChannel, or Infiniband) to accomplish reliable data transfer and interoperability between or among different devices and manufacturers. Two devices using the same protocol can be considered akin to two persons speaking the same language, and, when different protocols or languages are used, one or more translators may be required.

In certain configurations, there may exist several devices and/or computer applications that require multiple protocols. For example, consider a "server" architecture, in which the server (e.g., a box containing at least one motherboard with microprocessor and running computer programs) is connected to, and intended to provide functionality or services (e.g., performing computations or sharing data or resources) for, other "client" devices or programs.

The server needs to communicate, through the network, with one or more other devices or applications, which can include a hard disk drive (HDD) or solid-state drive (SSD), a general-purpose graphics processing unit (GP-GPU, GPGPU or GPGP), and/or other devices, applications or servers. To enable such communications, interfaces are used to create physical connections, such as from an on-board processor within the server to a peripheral device. These interfaces run protocols, such as PCIe, DDR (double data rate) and/or others. Each of the devices or other servers can have its own interface protocol. For example, the HDD may employ (connect through) SATA or SAS, and the SSD may employ SAS or PCIe, while the GP-GPU may employ PCIe. The network connecting these devices together may be Ethernet, which is generally considered a reliable and pervasive networking protocol, or another suitable protocol.

One approach to dealing with a configuration such as described above is to use translators to allow communications involving multiple protocols. For example, a Network Interface Card (NIC) may be used to connect together a server with an HDD or SSD. In that case, the NIC may be inserted between the server and the network connection to translate, for example, from the PCIe to Fiberchannel protocol. On the other end of the network, the HDD or SSD is connected through another NIC, which would translate from Fiberchannel to PCIe, or to a Host Bus Adapter which translates Fiberchannel to SAS or SATA. This translation process can be both inefficient and costly. For example, the NICs introduce latency and overhead in the data transactions which reduces overall system performance and increases power and cost.

Another approach is to create multiple separate, stand-alone networks, with each network using a particular protocol. For example, a configuration may include an Ethernet network and a FiberChannel network, each separate and optimized for the type of data being transmitted. However, this approach also has downsides, for example, the need to setup and maintain multiple networks.

Another approach, sometimes referred to as "tunneling," is to embed one protocol inside another, for example, putting PCIe data "frames" into Ethernet frames to be transported over Ethernet and then returned to PCIe on the other end of the connection. This approach generally reduces the performance of the connection to the lowest common denominator, or the slowest protocol. In this PCIe/Ethernet example, enhanced PCIe performance is lost as the data is transmitted as Ethernet packets during transmission, which results, for example, in certain latency burdens inherent in the Ethernet protocol.

In addition, the industry has generally standardized or shown a preference for several connector or module types and extensive infrastructure is already in place utilizing these types of connectors. For example, QSFP (such as shown in FIG. 1B and discussed above) is a pervasive module/connector that is used for Ethernet connectivity and carries four "lanes" of data, typically Ethernet. There is an inherent bias in the industry to continue using such connectors already in place, if possible, even as connectivity architectures evolve.

There exists a need for improved multi-protocol connectivity systems, apparatus and methods to overcome obstacles and deficiencies associated with conventional computer networks and environments involving multiple devices and associated protocols.

SUMMARY

This specification and the accompanying figures describe new technologies relating to the management and transportation of data in a networked environment or solution, such as data centers and cloud (or multi-cloud) services and systems. According to various embodiments, these technologies are used to transport data across individual wires or connections using uniform connection technology but different protocols.

For example, these technologies introduce a more efficient solution by allowing optionality in the connection between devices. The translation between protocols may be needed for certain network connections, but, for other network connections, remaining in the original protocol format would be preferred due to higher performance. The present disclosure solves this problem by enabling multiple protocols to be transmitted over a particular media without requiring translation. The decision as to which protocol is transmitted can be determined through software (e.g., a software-based controller), thus providing flexibility by allowing, for example, a software-defined protocol selection and reconfiguration solution based on application priorities and need.

In general, one aspect of the subject matter described in this specification can be embodied in methods that include the actions of, for example, receiving data corresponding to at least two communication protocols, detecting the at least two communication protocols, and automatically provisioning communication interfaces according to the detected communication protocols. Other embodiments of this aspect include corresponding systems, apparatus, and computer program products.

As also disclosed herein, for example, the subject matter further includes methods, systems, apparatus, and computer program products whereby data is received from multiple data communication inputs, at least two types of corresponding communication paths are determined, at least two data paths are automatically combined via multiplexing to result in fewer data streams, and data from the combined data paths is automatically detected and de-multiplexed to be output to a destination.

Additional details of one or more embodiments of the subject matter described in this specification are set forth in the accompanying figures and the description below. Other features, aspects, and advantages of the subject matter will become apparent from the descriptions contained herein and the accompanying figures.

Figure 1A:
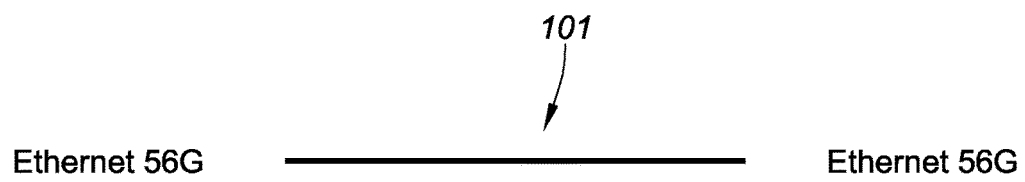
FIG. 1A shows an example of an exemplary wire over which data is carried.
Figure 1B:
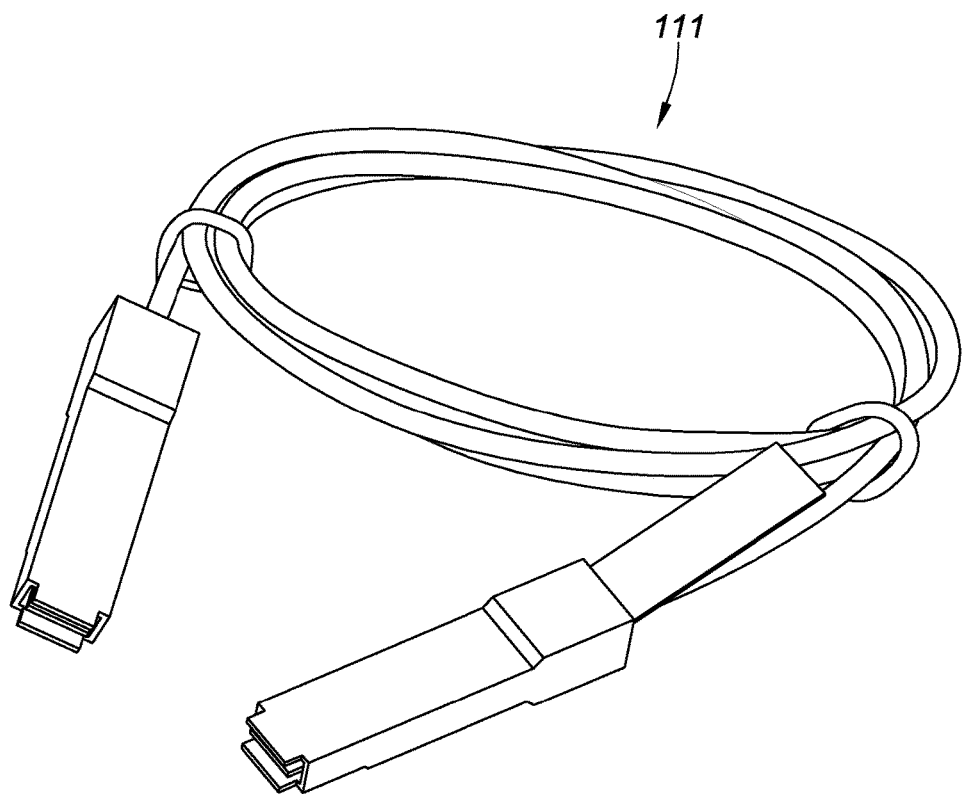
FIG. 1B shows an industry standard cable with QSFP module connectors.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION

According to various embodiments, multiple communications protocols are enabled for transporting data on the same medium. For illustrative purposes only and not for purposes of limitation, the technologies contemplated and described herein are now described with respect to a network environment in which both PCIe and Ethernet protocols are supported. One or more devices involved in this environment have an input-output (I/O) interface capable of supporting multiple protocols. The number of I/Os can vary. Additionally, the I/Os (or interface) of the device are connected to the I/Os (or interface) of one or more other devices using a variety of protocols. For example, the connection can include four lanes of PCIe data traffic and four lanes of Ethernet data traffic. As discussed herein, there are multiple ways to handle this environment (and other environments involving multiple devices and multiple protocols) in accordance with the principles disclosed herein.

To aid the description of various principles, consider the above-described illustrative configuration, in which four lanes of PCIe traffic and four lanes of Ethernet traffic need to be transported from a server to (1) a local device with four lanes of PCIe and (2) a remotely connected device, connected by Ethernet.

Figure 2:
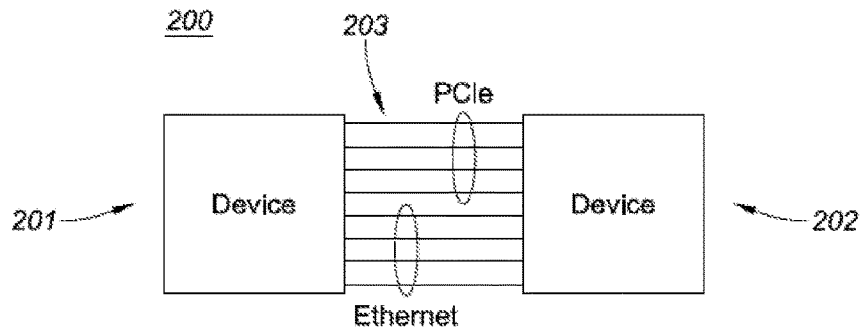
FIG. 2 shows an exemplary connection of two networked devices that includes eight wires for respective lanes of data traffic.

According to various embodiments, such as shown in FIG. 2, a system 200 can include a first device 201 and a second device 202 coupled by one or more intermediate wires or other communication connections 203. The first device 201, for example, can include a first I/O (or interface) (not shown) for communicating with the communication connections 203; whereas, the second device 202 can include a second I/O (or interface) (not shown) for communicating with the communication connections 203. The first and second devices 201, 202 thereby can exchange data or other information via the communication connections 203.

FIG. 2 shows that eight I/Os are connected between the first device 201 and the second device 202 through eight respective wires 203, and the protocol on each I/O is determined. Then, data is transported across and to the end of the eight wires 203 (including, for example, one or more copper or optical wires) and output in their original format. In addition, each device 201, 202 optionally can be equipped with a capability to automatically determine the protocol of each I/O and automatically provision each I/O to the proper protocol. This manner of implementation allows system implementations to mix protocols and have respective data transported in the same environment and not be limited to specific configurations.

According to various other embodiments, a server (or other device) (not shown) can take inputs and combine the data from different streams into fewer streams, using a proprietary protocol or format. For example, a path carrying PCIe data traffic can be multiplexed (e.g., time multiplexed or combined) with an Ethernet path and transported on a single wire to the destination and de-multiplexed and output to the receiving server or device.

Figure 3:
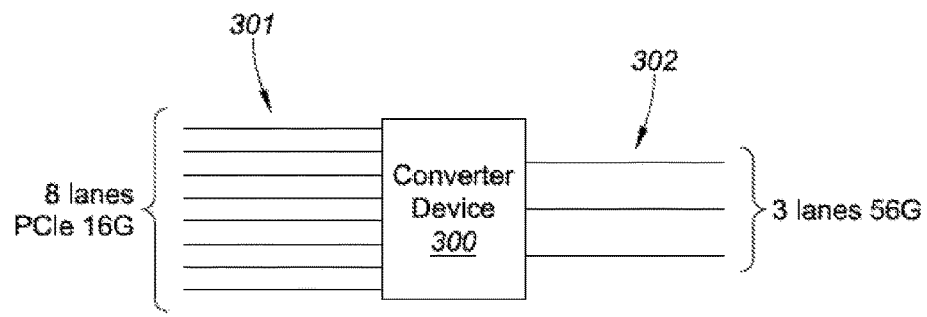
FIG. 3 shows an exemplary embodiment in which eight lanes of data traffic are converted into three lanes of data traffic.

FIG. 3 shows an illustrative embodiment of a converter device 300. The converter device 300 can be disposed between a first predetermined number of communication connections 301 and a second predetermined number of communication connections 302, wherein the first predetermined number can be greater than, less than or equal to the second predetermined number. Additionally and/or alternatively, the communication connections 301, 302 can support a common communication protocol and/or one or more different communication protocols. As illustrated in FIG. 3, for example, the converter device 300 can be disposed between a first predetermined number of PCIe lanes and a second predetermined number of Ethernet lanes. Stated somewhat differently, the communication connections 301 can include one or more PCIe lanes; whereas, the communication connections 302 can include one or more Ethernet lanes, wherein the number of PCIe lanes is greater than the number of Ethernet lanes. The converter device 300 thereby can combine the multiple PCIe lanes to form fewer Ethernet lanes. The combined data paths could utilize a standard format, such as Ethernet, but may suffer some performance degradation.

Alternatively, a proprietary protocol, such as a proprietary protocol that removes much of the networking overhead of Ethernet and/or other protocols and/or a proprietary protocol that improves or maximizes performance, may be used in accordance with the principles disclosed herein. According to various embodiments, a proprietary protocol can be chosen that simplifies data stream format to carry reduced, or only essential, information required at the other end of the connection. Because the connection is proprietary and point to point, the protocol can be simplified beyond standard formats.

According to yet other embodiments, either of the foregoing mechanisms or techniques may be incorporated into an industry standard connector/module, such as an SFP or QSFP module. In this scenario, for example, the module and associated cable function as a standard cable but is also able to automatically detect the traffic on each I/O and handle it appropriately per its associated protocol.

Figure 4:
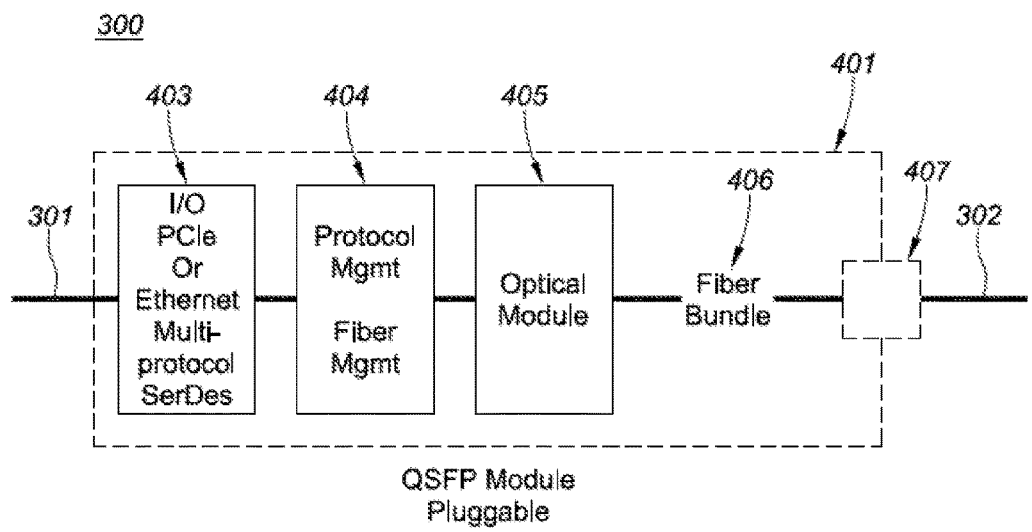
FIG. 4 shows an exemplary embodiment involving the usage of a QSFP module.

FIG. 4 shows an illustrative embodiment according to the principles disclosed herein, wherein the converter device 300 (shown in FIG. 3) can be provided as a customized QSFP module 401. Turning to FIG. 4, the QSFP module 401 can be disposed between a first predetermined number of communication connections 301 and a second predetermined number of communication connections 302 in the manner discussed in more detail above with reference to FIG. 3. The QSFP module 401 can include a first QSFP I/O (or electrical interface) 403 for communicating with the communication connections 301 and a second QSFP I/O (or electrical interface) 407 for communicating with the communication connections 302. If the communication connections 301 comprise one or more transmit lanes and one or more receive lanes, for example, the first QSFP I/O 403 can receive incoming data and other information via the receive lanes of the communication connections 301 and/or transmit outgoing data and other information via the transmit lanes of the communication connections 301. Additionally and/or alternatively, the second QSFP I/O 407 likewise can receive incoming data and other information via receive lanes of the communication connections 302 and/or transmit outgoing data and other information via transmit lanes of the communication connections 302.

As shown in FIG. 4, the first QSFP I/O 403 of the QSFP module 401 can include at least one multi-protocol capable SerDes (serializer/deserializer). The multi-protocol capable SerDes, for example, can support selected communication protocols, such as PCIe and/or Ethernet. The second QSFP I/O 407 advantageously can support one or more communication protocols, such as fiber optic and/or copper. The second QSFP I/O 407 is shown as being coupled with an optical I/O device, such as an optical module 405, via an optional fiber bundle 406. In selected embodiments, the second QSFP I/O 407 can include one or more fiber-optical connectors, such as a MXC® brand connector or plug manufactured by US Conec Ltd. located in Hickory, N.C. Additionally and/or alternatively, the QSFP module 401 can include an optional copper I/O module (not shown) for supporting communications between the second QSFP I/O 407 and a wired copper communication connection (not shown). In other words, the communication protocols supported by the second QSFP I/O 407 can be the same as, or different from, the communication protocols supported by the first QSFP I/O 403.

The QSFP module 401 can further include a protocol management device 404. The protocol management device 404 can be disposed between, and communicate with, the first QSFP I/O 403 and the second QSFP I/O 407. In the embodiment shown in FIG. 4, for example, the protocol management device 404 is illustrated as including a fiber management component. The protocol management device 404 can determine the protocol(s) of the incoming data and other information received by the QSFP module 401 and/or the protocol(s) of the outgoing data and other information transmitted by the QSFP module 401. The protocol management device 404 can be provided in any suitable manner, including as a computer or other type of processor or processing system.

These and related embodiments and principles can be used in any of many potential use cases, some examples of which are now provided.

According to various embodiments, the principles described herein are used for enterprise or cloud, rack scale solutions in which a PCIe fabric (network) is desired to maximize performance (speed, power or cost) and a traditional Ethernet network is desired as well. In this scenario, as different types of equipment are installed in the rack, the principles described herein can be used to provide flexibility in how the individual devices within the rack are interconnected to achieve one or more overall system performance goals or metrics.

According to various embodiments, the principles described herein are used in connection with a disaggregated storage solution, such as developed by R-Stor Inc. located in Saratoga, Calif., where a "Storage Server" node which performs storage management and control functions is located adjacent to the application servers and would maximize performance through a PCIe connection from the application server but also require an Ethernet connection to the broader network (between racks and rows).

Figure 5:
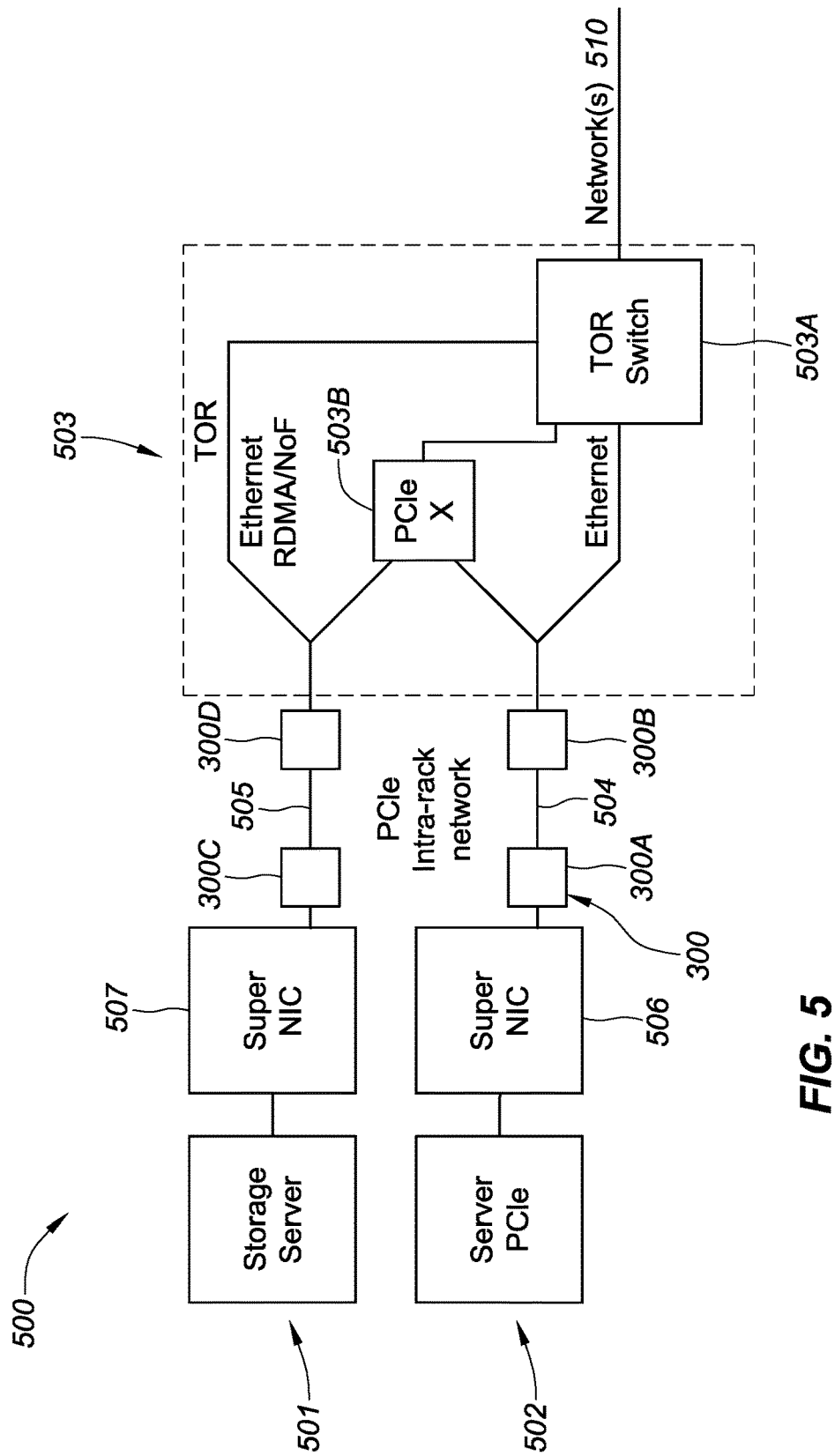
FIG. 5 shows an exemplary embodiment involving the usage of a disaggregated storage solution.

FIG. 5 shows an illustrative embodiment of a network 500 according to the principles disclosed herein involving the usage of a disaggregated storage solution. As shown, the network 500 can include a Top of Rack (ToR) switching system 503 that can enable one or more servers 502 and one or more storage servers 501 to communicate. In other words, the ToR switching system 503 can permit a selected server 502 to communicate with a second server 502, with at least one predetermined storage server 501 and/or with a separate network 510. The selected server 502 is shown as communicating with the ToR switching system 503 via a predetermined number of intermediate communication connections 504.

In some embodiments, the communication connections 504 can be provided in the manner discussed above with regard to the communication connections 301, 302 (shown in FIGS. 3 and 4) and can support at least one selected communication protocol. The communication connections 504, for example, preferably can comprise multi-protocol connector lanes in the manner discussed above with reference to the communication connections 203 (shown in FIG. 2). The communication connections 504 preferably include an optical communication connection or other high-speed communication connection. Two or more servers 502 can communicate with the ToR switching system 503 via common (or shared) communication connections 504, and/or individual (or separate) communication connections 504 can be provided between the ToR switching system 503 and the selected server 502.

Although the server 502 can communicate with the communication connections 504 directly, the network 500 advantageously can include a first multi-protocol converter device 300A for facilitating communications between the server 502 and the communication connections 504. The first converter device 300A, for example, can be provided in the manner set forth above with reference the multi-protocol converter device 300 (shown in FIGS. 3 and 4) and/or can be separate from, or at least partially integrated with, the server 502. As described in more detail above, the first converter device 300A can receive data and other information transmitted by the server 502 in a first communication protocol and convert the received data and other information into the selected communication protocol of the communication connections 504. The first converter device 300A likewise can receive data and other information in the selected communication protocol from the communication connections 504 and convert the received data and other information into the first communication protocol of the server 502.

In the embodiment shown in FIG. 5, the server 502 can communicate with the communication connections 504 via an optional network interface controller (or NIC or Super NIC) 506. The network interface controller 506 can be provided in any conventional manner and can help to further facilitate communications between the server 502 and the communication connections 504. If disposed between the server 502 and the first converter device 300A, for example, the network interface controller 506 provide an additional layer of communication protocol conversion.

The network interface controller 506 can receive data and other information transmitted by the server 502 in the first communication protocol and convert the received data and other information into one of the communication protocols supported by the first converter device 300A. Similarly, the network interface controller 506 can receive data and other information in the supported communication protocol from the first converter device 300A and convert the received data and other information into the first communication protocol of the server 502. Although shown and described as comprising a separate device in FIG. 5 for purposes of illustration only, the network interface controller 506 can be at least partially integrated with the server 502 and/or the first converter device 300A as desired.

Additionally and/or alternatively, the network 500 can include a second multi-protocol converter device 300B for facilitating communications between the communication connections 504 and the ToR switching system 503. Although the ToR switching system 503 can communicate with the communication connections 504 directly in some embodiments, the second converter device 300B advantageously can facilitate communications between the ToR switching system 503 and the communication connections 504. The second converter device 300B, for example, can be provided in the manner set forth above with reference the multi-protocol converter device 300 (shown in FIGS. 3 and 4) and/or can be separate from, or at least partially integrated with, the ToR switching system 503.

As described in more detail above, the second converter device 300B can receive data and other information transmitted by the ToR switching system 503 in a second communication protocol and convert the received data and other information into the selected communication protocol of the communication connections 504. The second converter device 300B likewise can receive data and other information in the selected communication protocol from the communication connections 504 and convert the received data and other information into the second communication protocol of the ToR switching system 503.

In some embodiments, the ToR switching system 503 can permit a selected storage server 501 to communicate with a second storage server 501, with at least one predetermined server 502 and/or with the separate network 510. The selected storage server 501 is shown as communicating with the ToR switching system 503 via a predetermined number of intermediate communication connections 505. In some embodiments, the communication connections 505 can be provided in the manner discussed above with regard to the communication connections 301, 302 (shown in FIGS. 3 and 4) and can support at least one second selected communication protocol.

The communication connections 505, for example, preferably can comprise multi-protocol connector lanes in the manner discussed above with reference to the communication connections 203 (shown in FIG. 2). The communication connections 505 can be the same as, or different from, the second selected communication protocol supported by the communication connections 504 and preferably include an optical communication connection or other high-speed communication connection. Two or more storage servers 501 can communicate with the ToR switching system 503 via common (or shared) communication connections 505, and/or individual (or separate) communication connections 505 can be provided between the ToR switching system 503 and the selected storage server 501.

Although the storage server 501 can communicate with the communication connections 505 directly, the network 500 advantageously can include a third multi-protocol converter device 300 for facilitating communications between the storage server 501 and the communication connections 505. The third converter device 300C, for example, can be provided in the manner set forth above with reference the multi-protocol converter device 300 (shown in FIGS. 3 and 4) and/or can be separate from, or at least partially integrated with, the storage server 501.

As described in more detail above, the third converter device 300C can receive data and other information transmitted by the storage server 501 in a third communication protocol and convert the received data and other information into the second selected communication protocol of the communication connections 505. The third converter device 300C likewise can receive data and other information in the second selected communication protocol from the communication connections 505 and convert the received data and other information into the third communication protocol of the storage server 501.

In the embodiment shown in FIG. 5, the storage server 501 can communicate with the communication connections 505 via an optional network interface controller (or NIC or Super NIC) 507. The network interface controller 507 can be provided in any conventional manner and can help to further facilitate communications between the storage server 501 and the communication connections 505. If disposed between the storage server 501 and the third converter device 300C, for example, the network interface controller 507 provide an additional layer of communication protocol conversion.

The network interface controller 507 can receive data and other information transmitted by the storage server 501 in the third communication protocol and convert the received data and other information into one of the communication protocols supported by the third converter device 300C. Similarly, the network interface controller 507 can receive data and other information in the supported communication protocol from the third converter device 300C and convert the received data and other information into the third communication protocol of the storage server 501. Although shown and described as comprising a separate device in FIG. 5 for purposes of illustration only, the network interface controller 507 can be at least partially integrated with the storage server 501 and/or the third converter device 300C as desired.

Additionally and/or alternatively, the network 500 can include a fourth multi-protocol converter device 300 for facilitating communications between the communication connections 505 and the ToR switching system 503. Although the ToR switching system 503 can communicate with the communication connections 505 directly in some embodiments, the fourth converter device 300D advantageously can facilitate communications between the ToR switching system 503 and the communication connections 505. The fourth converter device 300D, for example, can be provided in the manner set forth above with reference the multi-protocol converter device 300 (shown in FIGS. 3 and 4) and/or can be separate from, or at least partially integrated with, the ToR switching system 503.

As described in more detail above, the fourth converter device 300D can receive data and other information transmitted by the ToR switching system 503 in a fourth communication protocol and convert the received data and other information into the second selected communication protocol of the communication connections 505. The fourth converter device 300D likewise can receive data and other information in the second selected communication protocol from the communication connections 505 and convert the received data and other information into the fourth communication protocol of the ToR switching system 503.

The ToR switching system 503 can support any predetermined number of different switching protocols (or functionalities). In the embodiment shown in FIG. 5, for example, the ToR switching system 503 is illustrated as including PCIe and Ethernet switching functions. The ToR switching system 503 can include a PCIe switch module (or device) 503B that can be coupled with the second multi-protocol converter device 300B and the fourth multi-protocol converter device 300D. The second multi-protocol converter device 300B can convert the data and other information received from the selected server 502 via the communication connections 504 into a PCIe protocol and provide the converted data and other information in the PCIe protocol to the PCIe switch device 503B. The PCIe switch device 503B likewise can receive data and other information from the selected storage server 501, the network 510 and/or other data sources and convert the received data and other information into the selected communication protocol of the communication connections 504 for transmission to the selected server 502.

Similarly, the fourth multi-protocol converter device 300D can convert the data and other information received from the selected storage server 501 via the communication connections 505 into the PCIe protocol and provide the converted data and other information in the PCIe protocol to the PCIe switch device 503B. The PCIe switch device 503B likewise can receive data and other information from the selected server 502, the network 510 and/or the other data sources and convert the received data and other information into the second selected communication protocol of the communication connections 505 for transmission to the selected storage server 501. Although shown and described as including the PCIe switch module (or device) 503B for performing PCIe protocol conversions for purposes of illustration only, the ToR switching system 503 can include any predetermined number of switch modules (or devices) each supporting a respective communication protocol. The communication protocols can be the same and/or different among the switch devices.

The ToR switching system 503 also is shown as including a ToR switch module (or device) 503A. The ToR switch device 503A can be coupled with the second multi-protocol converter device 300B and the fourth multi-protocol converter device 300D. The second multi-protocol converter device 300B can convert the data and other information received from the selected server 502 via the communication connections 504 into an Ethernet protocol, such as and provide the converted data and other information in the Ethernet protocol to the ToR switch device 503A. The ToR switch device 503A can transmit the converted data and other information to the PCIe switch device 503B, the network 510, the fourth multi-protocol converter device 300D for conversion and transmission to the selected storage server 501 via the communication connections 505 and/or other data destinations. Additionally and/or alternatively, the ToR switch device 503A likewise can receive data and other information from the selected storage server 501, the PCIe switch device 503B, the network 510 and/or the other data sources and convert the received data and other information into the selected communication protocol of the communication connections 504 for transmission to the selected server 502.

Similarly, the fourth multi-protocol converter device 300D can convert the data and other information received from the selected storage server 501 via the communication connections 505 into the Ethernet protocol and provide the converted data and other information in the Ethernet protocol to the ToR switch device 503A. The converted data and other information can comprise data and other information received via remote direct memory access (RDMA) communications. The ToR switch device 503A can transmit the converted data and other information to the PCIe switch device 503B, the network 510, the second multi-protocol converter device 300B for conversion and transmission to the selected server 502 via the communication connections 504 and/or the other data destinations. The ToR switch device 503A likewise can receive data and other information from the selected server 502, the PCIe switch device 503B, the network 510 and/or the other data sources and convert the received data and other information into the second selected communication protocol of the communication connections 505 for transmission to the selected storage server 501.

Advantageously, the first and third converter devices 300A, 300C can selectively choose which protocol is carried by the communication connections 504, 505 during data transmission from the selected server 502 and the selected storage server 501, respectively, to the ToR switching system 503. Additionally and/or alternatively, the second and fourth converter devices 300B, 300D can selectively choose which protocol is carried by the respective communication connections 504, 505 during data transmission from the ToR switching system 503 to the selected server 502 and the selected storage server 501.

The respective communication connections 504, 505 preferably comprise multi-protocol connector lanes. In one preferred embodiment, the communication connection 504 includes four data lanes, wherein the selected server 502 can utilize two of the four data lanes for exchanging data and other information in the PCIe communication protocol and the other two data lanes for exchanging data and other information in the Ethernet communication protocol. Additionally and/or alternatively, the communication connection 505 includes four data lanes, wherein the selected storage server 501 can utilize two of the four data lanes for exchanging data and other information in the PCIe communication protocol and the other two data lanes for exchanging data and other information in the Ethernet communication protocol.

According to various embodiments, the principles described herein are for suppliers or other individuals or entities preferring to use "standard" interconnects, such as QSFP modules. Many of these modules are currently set up to support Ethernet only, and the principles discussed herein can be applied to allow the use of standard modules and connectors (e.g., QSFP) to transport whatever standard (or mix of standards) is desired.

Figure 6:
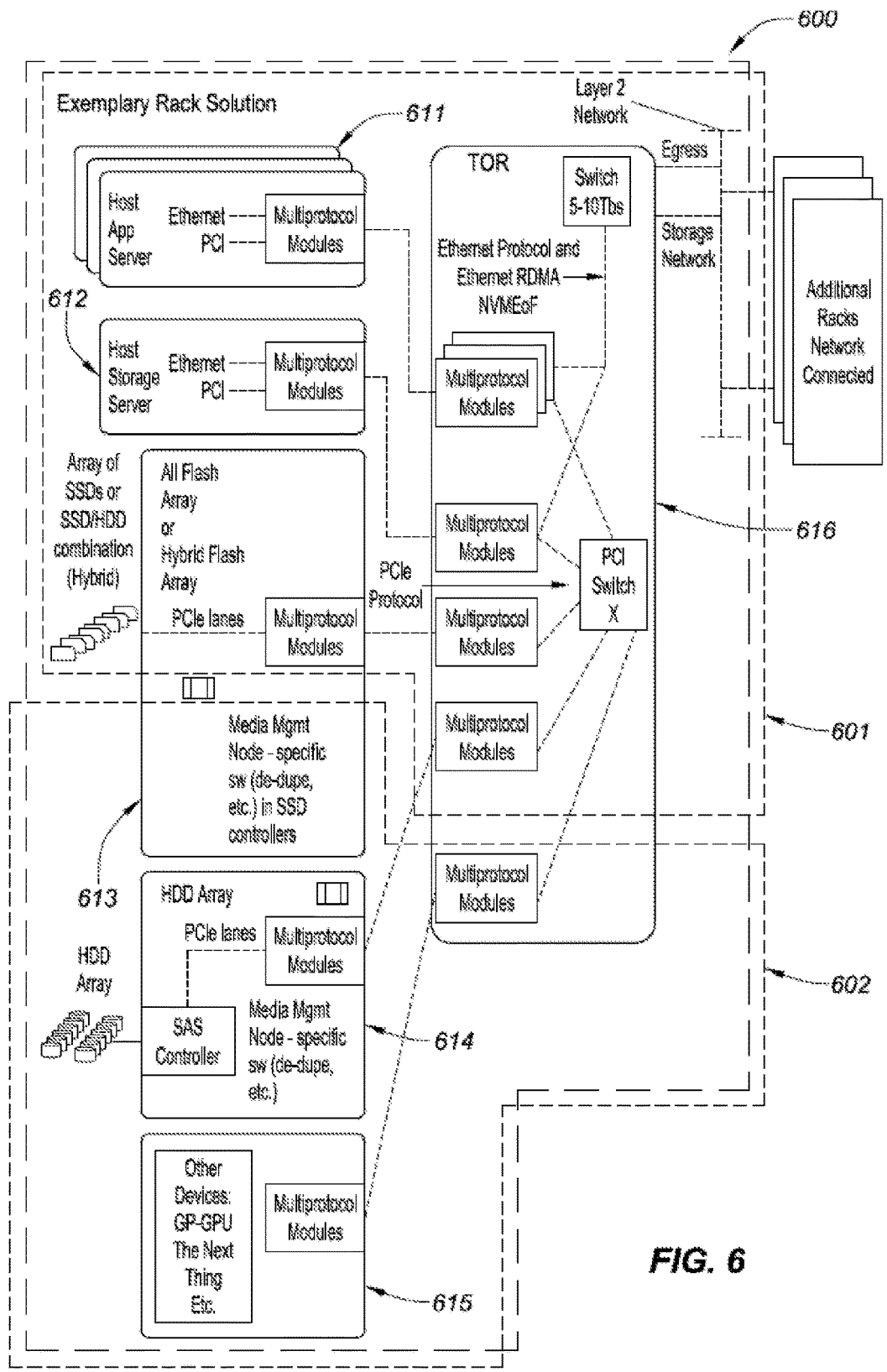
FIG. 6 shows an exemplary network environment in which certain principles disclosed herein are implemented.

FIG. 6 shows an exemplary network environment 600 in accordance with the principles disclosed herein. Turning to FIG. 6, network environment 600 includes Application Servers 611, Storage Servers 612, one or more types of storage arrays 613, 614 (including, e.g., an All Flash Array, Hybrid Array and/or HDD Array), as well one or more other devices 615, such as a GP-GPU. In this example, one or more of the elements are connected through respective multi-protocol modules and a mesh network centered in the ToR (Top of Rack) 616. This example shows both a PCIe network and an Ethernet based Network, although it will be understood that the principles disclosed herein are not limited to such a configuration.

As shown, for example, Application Servers 611 and Storage Servers 612 are connected both through Ethernet as well as PCIe protocols. In this example, the other devices, e.g. All Flash Array or Hybrid Array, HDD array, and/or GP-GPU, are connected through PCIe only. The PCIe network is local to the rack in this example and the Ethernet network extends beyond the rack to connect with other racks, either on the storage network or the egress network. The multi-protocol modules allow standardization of the connection mechanics and electronics while maintaining flexibility on the protocol which is being transmitted.

Figure 7:
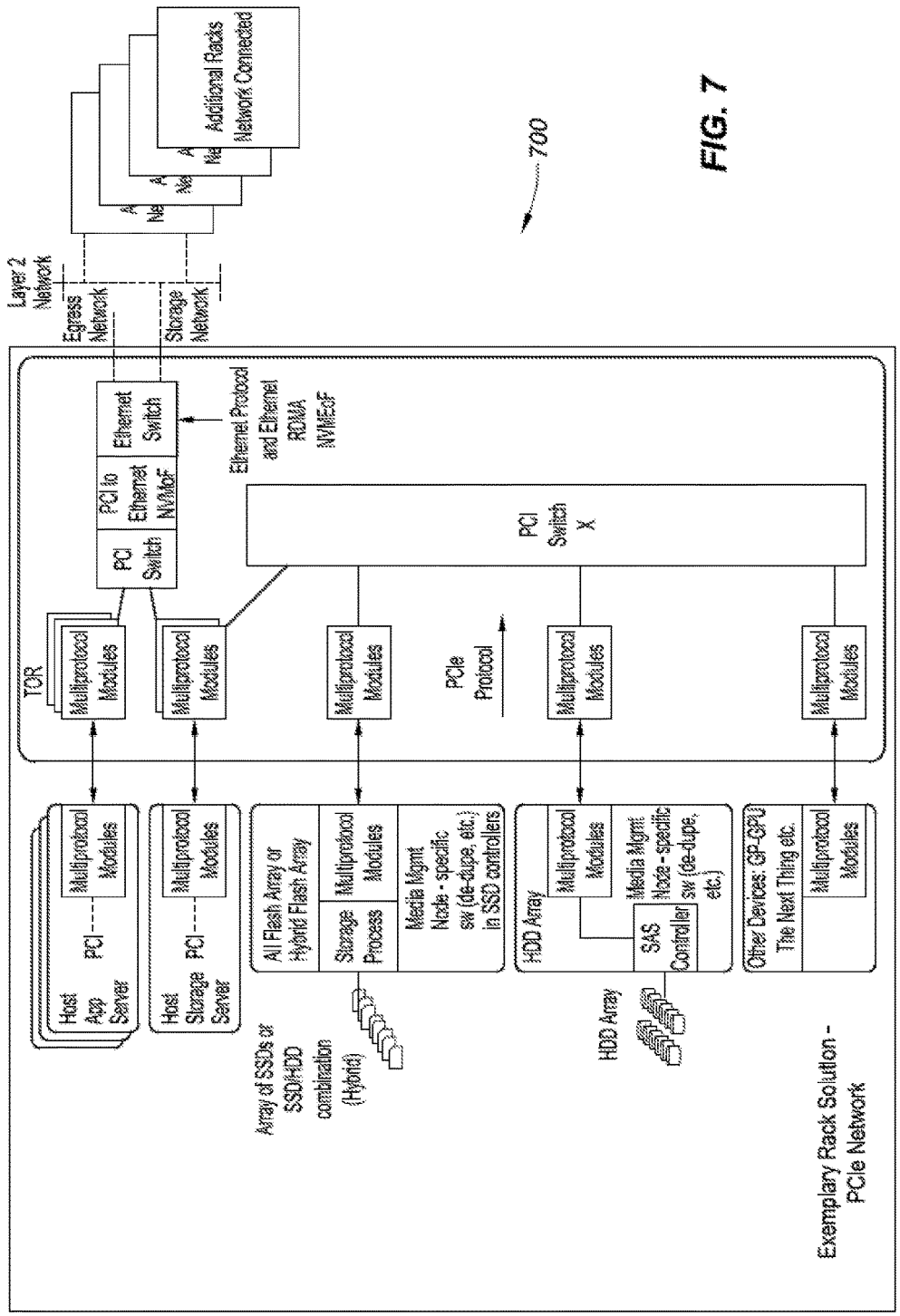
FIGS. 7-9 show additional exemplary network environments in which certain principles disclosed herein are implemented.
Figure 8:
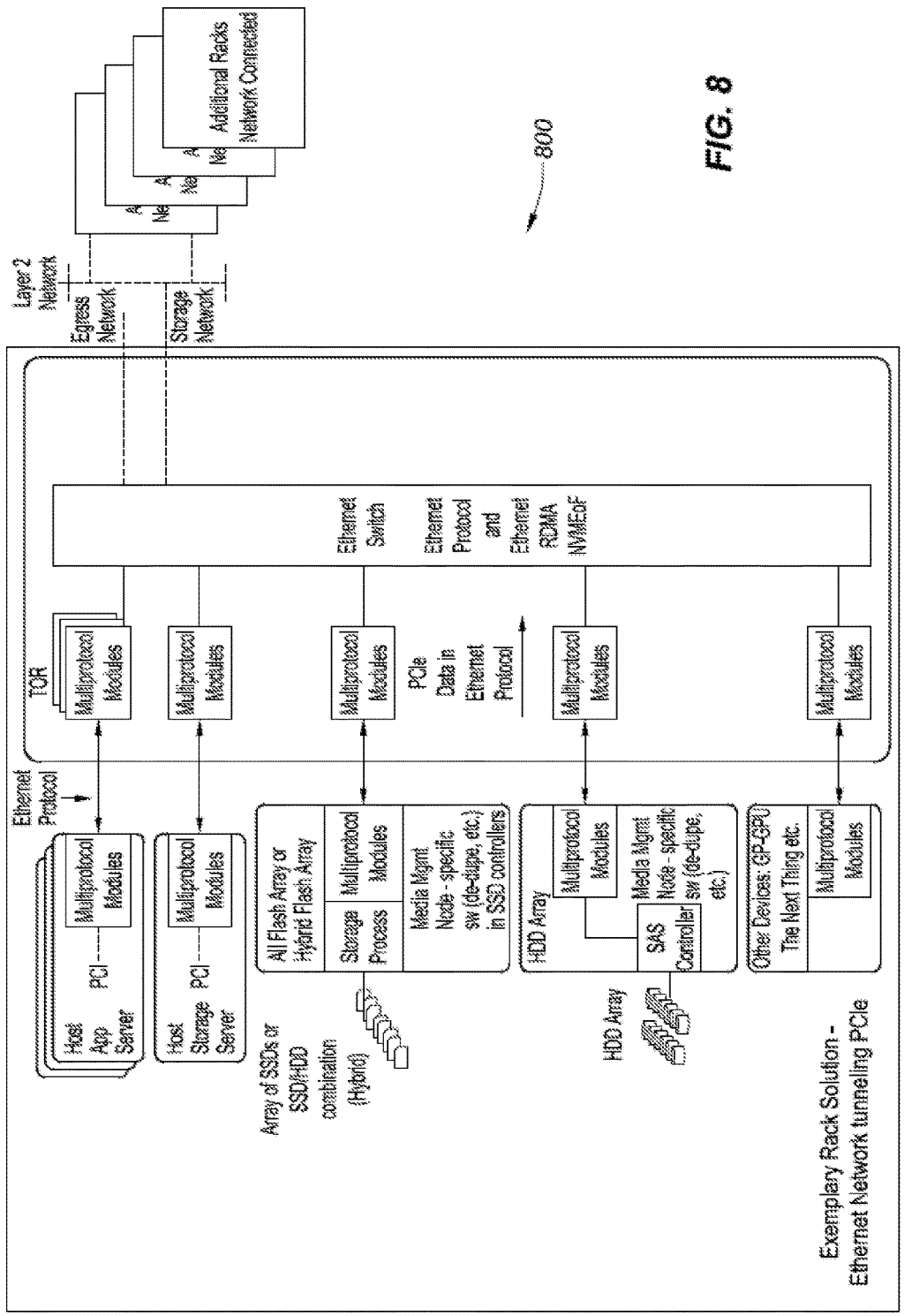
Figure 9:
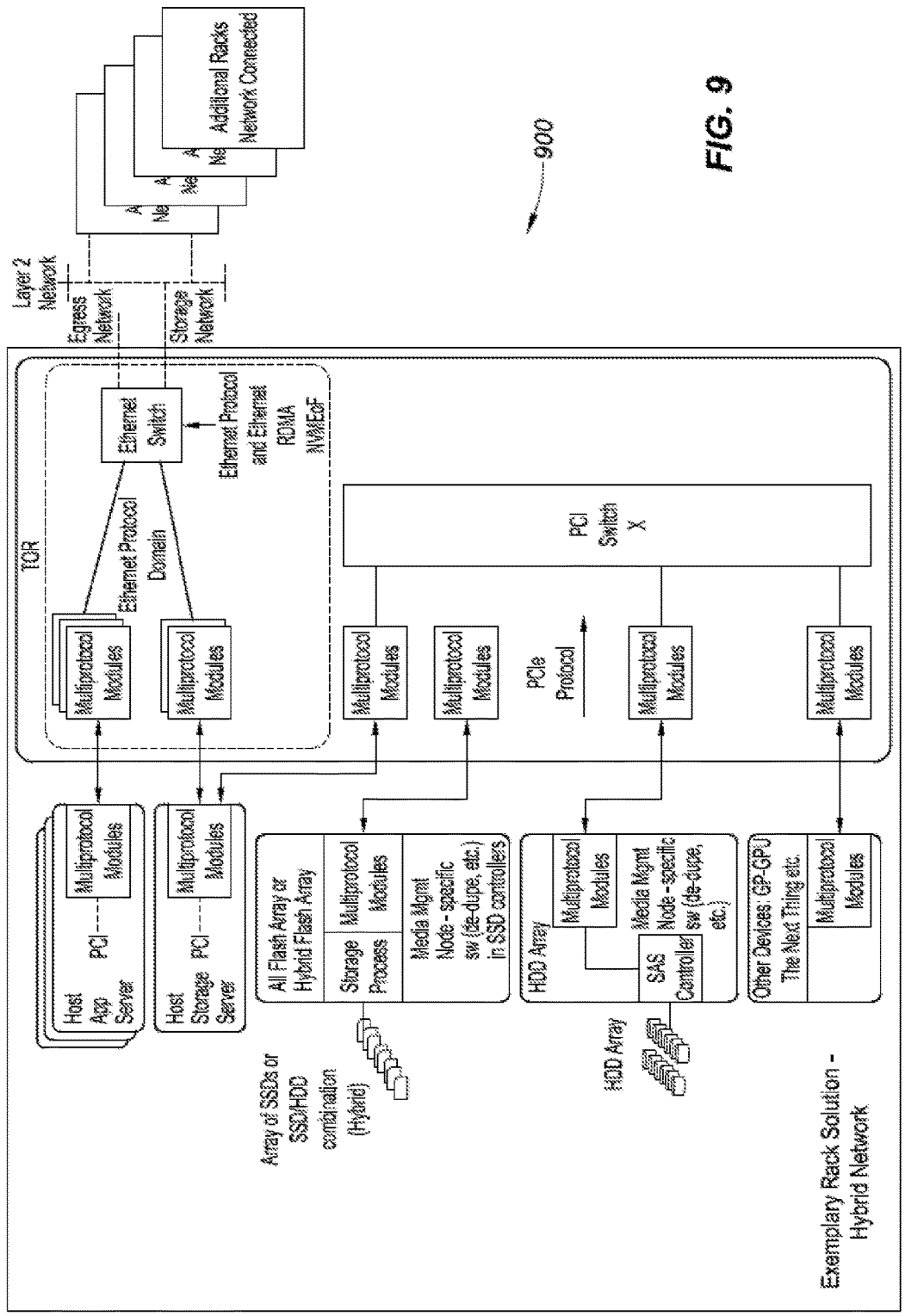

FIGS. 7-9 show additional exemplary network environments 700, 800 and 900 in accordance with the principles disclosed herein. As shown and will be understood to persons of ordinary skill in the art, the principles disclosed herein can be applied to PCIe, Ethernet, and/or mixed network environments.

Figure 10:
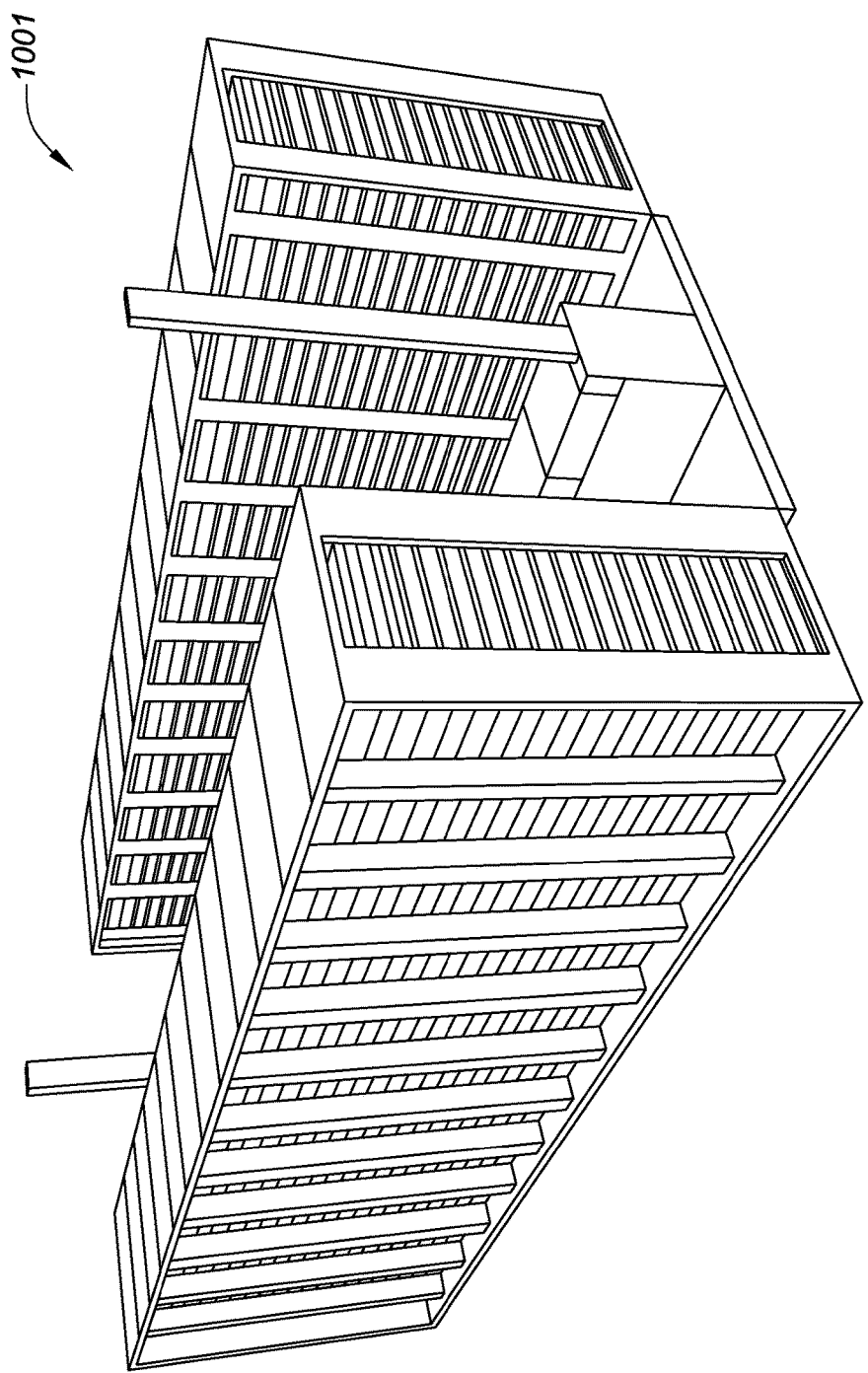
FIG. 10 shows an image of an exemplary row of racks in which certain principles disclosed herein are implemented.

FIG. 10 shows an image of an exemplary row of racks 1001 (e.g., server racks) which can be implemented using the principles disclosed herein.

Persons of ordinary skill in the art will understand that, although particular embodiments have been described above and shown in the figures, the principles described herein can be applied to different types of networked solutions, including but not limited to those involving data centers and cloud services.

As another example, the principles disclosed herein are used to facilitate data communications involving a multiple hard drive storage configuration, in which multiple internal hard drives are located in a single box or enclosure or otherwise grouped, and are accessed through a common controller (e.g., SAS) that is associated with the enclosed or grouped hard drives. According to various embodiments, the controller is disaggregated from any particular hard drive, such that the language can be customized between application and storage controllers. It will be understood that, although drives are used in this example, the principles discussed apply to other types of devices and configurations.

Additionally, although specific network environments (number and type of devices, connections, protocols, etc.) have been described above for the purpose of simplifying the description, it will be understood to persons of ordinary skill in the art that this is illustrative only. It will also be understood that reference to a "device" herein can refer to a server or any other type of suitable device. The principles discussed herein can be generalized to any number and configuration of devices and protocols.

Embodiments of the subject matter described herein can be implemented in digital electronic circuitry, or in computer software, firmware, or hardware, including the structures disclosed and shown in this specification and the accompanying figures, and their structural equivalents, or in combinations of one or more of the foregoing. Moreover, the subject matter can be implemented as part of one or more computer program modules or products, including computer program instructions encoded on a tangible program carrier for execution by, or to control the operation of, a data processing apparatus. The tangible program carrier can be a computer readable medium suitable for storing computer program instructions, such as a machine-readable storage device, a machine-readable storage substrate, a memory device, other forms of non-volatile memory, or a combination of one or more of them.

Terms such as "processor" encompasses all apparatus, devices, and machines for processing data, such as a programmable processor, general and special purpose microprocessors, a computer, or multiple processors or computers. Generally, a processor will receive instructions and data from a read only memory (ROM) or a random access memory (RAM), or both. The essential elements of a computer are a processor for performing instructions and one or more memory devices for storing instructions and data. A computer will also generally include or be operatively coupled to receive data from or transfer data to, or both, one or more mass storage devices for storing data (such as magnetic, magneto optical disks, or optical disks). However, a computer need not have such devices. Moreover, a computer can be embedded in another device, such as a mobile telephone, a personal digital assistant (PDA), a mobile audio or video player, a game console, a Global Positioning System (GPS) receiver, for example.

The embodiments contemplated herein can include, in addition to hardware, code that creates an execution environment for the computer program in question, e.g., code that constitutes processor firmware, a protocol stack, a database management system, an operating system, or a combination of one or more of them.

Software (also referred to as programs, applications, script, code, etc.) according to the principles described herein can be written in any form of programming language, including compiled or interpreted languages, or declarative or procedural languages, and it can be deployed in any form, including as a stand-alone program or as a module, component, subroutine, or other unit suitable for use in a computing environment. A computer program need not correspond to a file in a file system. A program can be stored in a portion of a file that holds other programs or data (such as one or more scripts stored in a markup language document), in a single file dedicated to the program in question, or in multiple coordinated files (such as files that store one or more modules, sub programs, or portions of code). A computer program can be deployed to be executed on one computer or on multiple computers that are located at one site or distributed across multiple sites and interconnected by a communication network.

To provide for interaction with a software programmer or other use, embodiments of the subject matter described in this specification can be implemented on a computer having a display device, such as an LCD (liquid crystal display) monitor, for displaying information to the user and a keyboard and a pointing device, such as a mouse, by which the user can provide input to the computer. Other kinds of devices can be used to provide for interaction with a user as well; for example, feedback provided to the user can be any form of sensory feedback, such as visual feedback, auditory feedback, or tactile feedback. Additionally, input from the user can be received in any form, including acoustic, speech, or tactile input.

Embodiments of the subject matter described in this specification can be implemented in a computing system that includes a back end component, such as a data server, or that includes a middleware component, such as an application server, or that includes a front end component, such as a client computer having a graphical user interface or a Web browser through which a user can interact with an implementation of the subject matter described is this specification, or any combination of one or more such back end, middleware, or front end components. The components of the system can be interconnected by any form or medium or communication network, such as a local area network (LAN), or wide area network (WAN) such as the Internet, or both.

While this specification contains particular implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while certain details are depicted in the figures, this should not be understood as requiring that any or all such details be included (or any or all identified features or steps be performed in a particular order), to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the principles discussed herein. For example, the embodiments shown in the figures can be modified or combined and still achieve desirable results.

What is claimed is:

1. A converter device for managing data connectivity among diverse network devices, comprising:
   a first input-output interface supporting each of a first plurality of communication protocols and for receiving first data provided by a first network device;
   a second input-output interface supporting each of a second plurality of communication protocols and for communicating with a second network device; and
   a protocol management circuit for identifying a first communication protocol of the received first data and converting the received first data into a second communication protocol among the second plurality of communication protocols,
   wherein said second input-output interface transmits the converted first data to the second network device, and
   wherein said second input-output interface communicates with the second network device via a second communication connection that supports the second communication protocol, wherein the second communication connection comprises a plurality of second communication lanes, and wherein said protocol management circuit identifies a predetermined number of the second communication lanes for transmitting the converted first data to the second network device based upon the second communication protocol, or
   wherein said second input-output interface receives second data provided by the second network device, wherein said protocol management circuit identifies a communication protocol of the received second data and converts the received second data into the first communication protocol, and wherein said first input-output interface transmits the converted second data to the first network device, or
   wherein said first input-output interface comprises a multiprotocol-capable serializer/deserializer that supports an Ethernet communication protocol, a Peripheral Component Interconnect communication protocol, a Peripheral Component Interconnect Express communication protocol, a Serial Attached SCSI communication protocol, a Serial AT Attachment communication protocol, a FiberChannel communication protocol, an Infiniband communication protocol or a combination thereof, or
   a combination thereof.

2. The converter device of claim 1, wherein the predetermined number of the second communication lanes is a subset of the plurality of second communication lanes.

3. The converter device of claim 1, wherein said protocol management circuit associates a respective predetermined number of the second communication lanes with each of the second plurality of communication protocols.

4. The converter device of claim 1, wherein said protocol management circuit identifies the second communication protocol based upon one or more communication protocols supported by the second communication connection.

5. The converter device of claim 1, wherein the second communication connection supports only the second communication protocol.

6. The converter device of claim 1, wherein said protocol management circuit identifies the communication protocol of the received second data as being the second communication protocol.

7. The converter device of claim 1, wherein said first input-output interface communicates with the first network device via a first communication connection that supports the first communication protocol.

8. The converter device of claim 7, wherein the first communication connection comprises a plurality of first communication lanes, and wherein said protocol management circuit identifies a predetermined number of the first communication lanes for transmitting the converted first data to the first network device based upon the first communication protocol.

9. The converter device of claim 8, wherein the predetermined number of the first communication lanes is a subset of the plurality of first communication lanes.

10. The converter device of claim 8, wherein said protocol management circuit associates a respective predetermined number of the first communication lanes with each of the first plurality of communication protocols.

11. The converter device of claim 7, wherein said protocol management circuit identifies the first communication protocol based upon one or more communication protocols supported by the first communication connection.

12. The converter device of claim 7, wherein the first communication connection supports only the first communication protocol.

13. The converter device of claim 1, wherein the first plurality of communication protocols and the second plurality of communication protocols share at least one common communication protocol.

14. The converter device of claim 1, wherein said second input-output interface comprises an optical input-output interface device, a copper input-output interface device or a combination thereof.

15. A method for managing data connectivity among diverse network devices, comprising:
receiving first data provided by a first network device via a first input-output interface supporting each of a first plurality of communication protocols;
identifying a first communication protocol of the received first data;
converting the received first data into a second communication protocol among a second plurality of communication protocols supported by a second input-output interface; and
transmitting the converted first data to a second network device via the second input-output interface,
wherein the second input-output interface communicates with the second network device via a second communication connection that supports the second communication protocol, wherein the second communication connection comprises a plurality of second communication lanes, and wherein a predetermined number of the second communication lanes is identified for transmitting the converted first data to the second network device based upon the second communication protocol, or
wherein the second input-output interface receives second data provided by the second network device, wherein a communication protocol of the received second data is identified and the received second data is converted into the first communication protocol, and wherein the first input-output interface transmits the converted second data to the first network device, or wherein the first input-output interface comprises a multiprotocol-capable serializer/deserializer that supports an Ethernet communication protocol, a Peripheral Component Interconnect communication protocol, a Peripheral Component Interconnect Express communication protocol, a Serial Attached SCSI communication protocol, a Serial AT Attachment communication protocol, a FiberChannel communication protocol, an Infiniband communication protocol or a combination thereof, or a combination thereof.

16. The method of claim 15, wherein the predetermined number of the second communication lanes is a subset of the plurality of second communication lanes.

17. The method of claim 15, wherein a respective predetermined number of the second communication lanes are associated with each of the second plurality of communication protocols.

18. The method of claim 15, further comprising identifying the second communication protocol based upon one or more communication protocols supported by the second communication connection.

19. The method of claim 15, wherein the second communication connection supports only the second communication protocol.

20. The method of claim 15, further comprising identifying the communication protocol of the received second data as being the second communication protocol.

21. The method of claim 15, wherein the first input-output interface communicates with the first network device via a first communication connection that supports the first communication protocol.

22. The method of claim 21, wherein the first communication connection comprises a plurality of first communication lanes, and further comprising identifying a predetermined number of the first communication lanes for transmitting the converted first data to the first network device based upon the first communication protocol.

23. The method of claim 22, wherein the predetermined number of the first communication lanes is a subset of the plurality of first communication lanes.

24. The method of claim 22, further comprising associating a respective predetermined number of the first communication lanes with each of the first plurality of communication protocols.

25. The method of claim 21, further comprising identifying the first communication protocol based upon one or more communication protocols supported by the first communication connection.

26. The method of claim 21, wherein the first communication connection supports only the first communication protocol.

27. The method of claim 15, wherein the first plurality of communication protocols and the second plurality of communication protocols share at least one common communication protocol.

28. The method of claim 15, wherein the second input-output interface comprises an optical input-output interface device, a copper input-output interface device or a combination thereof.

29. A computer program product for managing data connectivity among diverse network devices, the computer program product being encoded on one or more non-transitory machine-readable storage media and comprising:

instruction for receiving first data provided by a first network device via a first input-output interface supporting each of a first plurality of communication protocols;

instruction for identifying a first communication protocol of the received first data;

instruction for converting the received first data into a second communication protocol among a second plurality of communication protocols supported by a second input-output interface; and instruction for transmitting the converted first data to a second network device via the second input-output interface, wherein said instruction for receiving the first data, said instruction for identifying the first communication protocol, said instruction for converting the received first data and said instruction for transmitting the converted first data are stored on the non-transitory machine-readable storage media, and wherein the second input-output interface communicates with the second network device via a second communication connection that supports the second communication protocol, wherein the second communication connection comprises a plurality of second communication lanes, and wherein a predetermined number of the second communication lanes is identified for transmitting the converted first data to the second network device based upon the second communication protocol, or wherein the second input-output interface receives second data provided by the second network device, wherein a communication protocol of the received second data is identified and the received second data is converted into the first communication protocol, and wherein the first input-output interface transmits the converted second data to the first network device, or wherein the first input-output interface comprises a multiprotocol-capable serializer/deserializer that supports an Ethernet communication protocol, a Peripheral Component Interconnect communication protocol, a Peripheral Component Interconnect Express communication protocol, a Serial Attached SCSI communication protocol, a Serial AT Attachment communication protocol, a FiberChannel communication protocol, an Infiniband communication protocol or a combination thereof, or a combination thereof.

30. The computer program product of claim 29, wherein the predetermined number of the second communication lanes is a subset of the plurality of second communication lanes.

31. The computer program product of claim 29, wherein a respective predetermined number of the second communication lanes are associated with each of the second plurality of communication protocols.

32. The computer program product of claim 29, further comprising instruction for identifying the second communication protocol based upon one or more communication protocols supported by the second communication connection.

33. The computer program product of claim 29, wherein the second communication connection supports only the second communication protocol.

34. The computer program product of claim 29, further comprising instruction for identifying the communication protocol of the received second data as being the second communication protocol.

35. The computer program product of claim 29, wherein the first input-output interface communicates with the first network device via a first communication connection that supports the first communication protocol.

36. The computer program product of claim 35, wherein the first communication connection comprises a plurality of first communication lanes, and further comprising instruction for identifying a predetermined number of the first communication lanes for transmitting the converted first data to the first network device based upon the first communication protocol.

37. The computer program product of claim 36, wherein the predetermined number of the first communication lanes is a subset of the plurality of first communication lanes.

38. The computer program product of claim 36, further comprising instruction for associating a respective predetermined number of the first communication lanes with each of the first plurality of communication protocols.

39. The computer program product of claim 35, further comprising instruction for identifying the first communication protocol based upon one or more communication protocols supported by the first communication connection.

40. The computer program product of claim 35, wherein the first communication connection supports only the first communication protocol.

41. The computer program product of claim 29, wherein the first plurality of communication protocols and the second plurality of communication protocols share at least one common communication protocol.

42. The computer program product of claim 29, wherein the second input-output interface comprises an optical input-output interface device, a copper input-output interface device or a combination thereof.

* * * * *